United States Patent [19]

Jensen

[11] Patent Number: 5,667,041
[45] Date of Patent: Sep. 16, 1997

[54] SUSPENSION STRUT WITH HYDRAULIC STOP

[75] Inventor: Eric Lee Jensen, Dayton, Ohio

[73] Assignee: General Motors Corporation, Detroit, Mich.

[21] Appl. No.: 552,450

[22] Filed: Nov. 3, 1995

[51] Int. Cl.[6] .................................................. F16F 9/34
[52] U.S. Cl. .......................... 188/284; 188/275; 267/226
[58] Field of Search .................................. 188/284, 285, 188/275; 267/217, 220, 228

[56] References Cited

U.S. PATENT DOCUMENTS

| | | | |
|---|---|---|---|
| 3,621,949 | 11/1971 | Watson | 188/284 |
| 4,254,849 | 3/1981 | Pohlenz | 188/275 |
| 4,838,393 | 6/1989 | Mourray et al. | 188/284 |

FOREIGN PATENT DOCUMENTS

| | | | |
|---|---|---|---|
| 1208949 | 1/1966 | Germany | 267/226 |

Primary Examiner—Matthew C. Graham
Attorney, Agent, or Firm—Jeffrey A. Sedlar

[57] ABSTRACT

A rebound cutoff feature is provided for a strut-type suspension damper which includes a hydraulic stop feature in combination with a mechanical stop to limit rebound travel. The strut's piston rod carries a valve collar which interacts with the sole flow passage between the compression and rebound chambers of the strut to hydraulically decelerate movement as the rebound travel limit of the strut is approached.

6 Claims, 2 Drawing Sheets

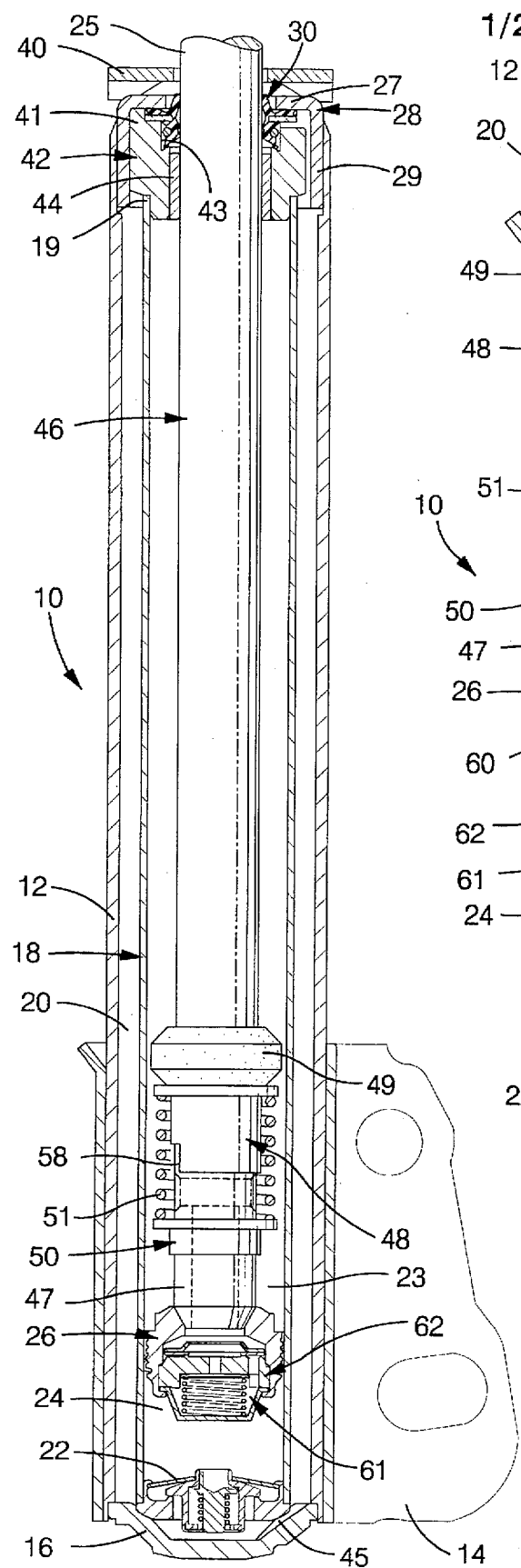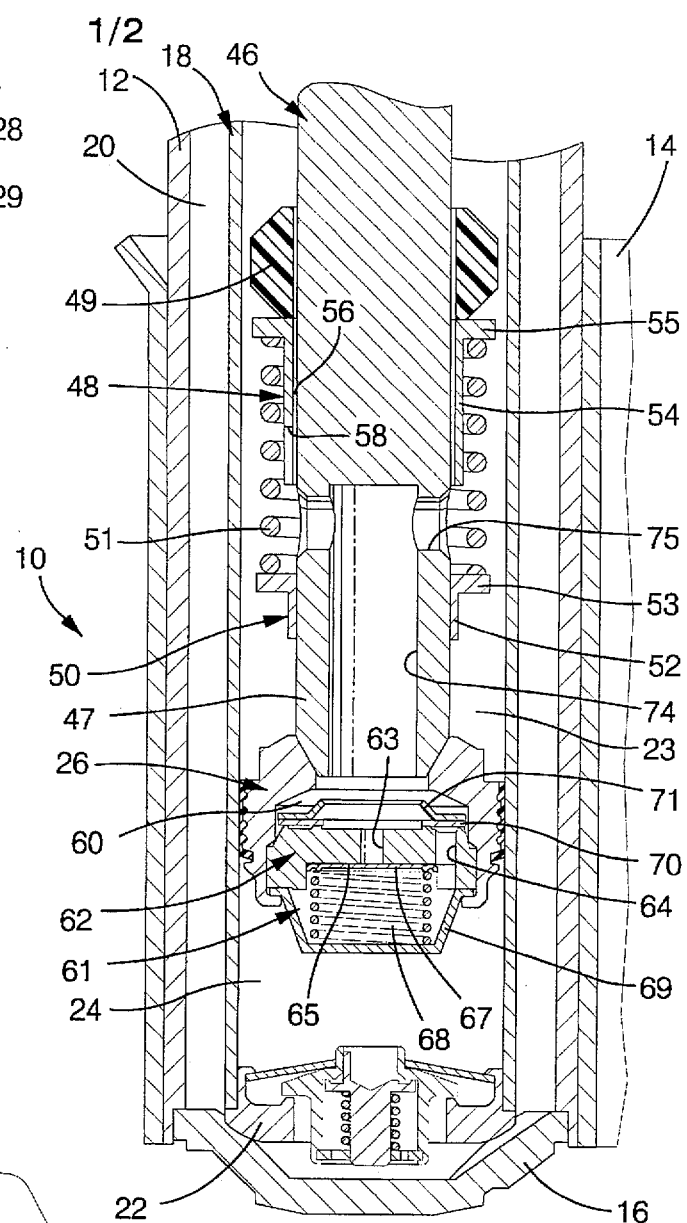
FIG. 1
FIG. 2

SUSPENSION STRUT WITH HYDRAULIC STOP

BACKGROUND OF THE INVENTION

The present invention relates to a suspension damper and more particularly, to a strut-type suspension damper with a hydraulic stop for use in vehicular applications.

A suspension strut is a type of damper that operates in vehicular suspensions as both a damping device and as part of the suspension's load bearing structure. Hydraulic struts are conventionally known wherein a piston with a connected piston rod is slidably carried in a fluid-filled tube. A rod guide at the top end of the tube slidably engages the piston rod. It is also known to provide a mechanical rebound stop which is fixedly engaged to the piston rod and is contactable with the rod guide to provide a means of limiting the maximum extension of the piston rod from the damper.

A typical rebound stop is generally equipped with a resilient bumper made of material such as rubber or urethane. The bumper is designed to cushion the engagement of the rebound stop with the rod guide at the end of strut travel in the rebound direction. This type of a mechanical stop tends to result in somewhat of an abrupt means of limiting travel during rebound.

It is also known to provide a hydraulic rebound stop with a shock-absorber type of damper. Such a device is disclosed in U.S. Pat. No. 3,621,949. These hydraulic rebound stop devices have generally been limited in application to shock-absorber type dampers for a variety of reasons. One factor that has been a hindrance in applying hydraulic rebound stops to strut-type dampers is that the rod guide bearing in a strut is of a more complicated design than that found in a shock absorber. The strut type of rod guide is not amenable to application of the hydraulic rebound stop as typically used with shock-absorber type dampers.

A second complicating factor involves the nature and the performance of a strut. The generally steeply increasing nature of the pressure rise in a typical hydraulic stop as used in shock-absorber type dampers is acceptable when applied to a shock absorber but would generally be considered undesirable in the performance of a strut-type damper.

A third complicating factor is related to the nature of a strut-type damper as compared to a shock absorber. A shock absorber generally only provides damping in the longitudinal direction between the sprung and unsprung masses of a vehicle. In contrast, in addition to providing the damping function in a suspension system, a strut-type damper must support lateral loading in the suspension system and must be adaptable to providing a turning function when used on the front suspension of a vehicle. Therefore, in light of differences between strut-type dampers and shock-absorber type dampers, hydraulic rebound stops have generally been limited in application to the shock-absorber type.

SUMMARY OF THE INVENTION

An aspect of the present invention is to provide a means of significantly increasing damping pressure as a strut-type damper extends into full rebound to provide a means of reducing the abruptness of a mechanical rebound stop. According to this aspect, a suspension system's strut-type damper includes a cylinder tube which slidably and sealingly carries a piston that is fixedly engaged to a piston rod. The piston and piston rod assembly have a common longitudinal bore which enters through the piston and extends partly through the adjoining portion of the piston rod. A cross bore extending through the piston rod intersects the longitudinal bore. The bores provide a means of communication between the compression and rebound chambers of the damper through the piston and piston rod.

The piston separates the cylinder tube into compression and rebound chambers and includes generally conventional damping valves with all flow between the compression and rebound chambers being directed through the damping valves, the longitudinal bore and the cross bore.

A spring seat is fixed to the piston rod between the piston and the cross bore. The spring seat supports a rebound cutoff valve collar which is normally separated from the spring seat by a spring such that the valve collar is positioned about the piston rod above the cross bore.

As the strut approaches a full rebound condition, the rebound cutoff valve collar is forced by the rod guide to compress the spring and therefore, to move downward on the piston rod. This downward movement results in closure of the cross bore such that fluid flow between the rebound and compression chambers is restricted. As fluid flow is restricted, the rebound travel of the strut is slowed and is positively limited by mechanical engagement of the valve collar with the spring seat.

By selectively sizing the cross bore through the piston rod and a gap between the rebound cutoff valve collar and the piston rod, the rate of pressure rise can be advantageously tailored to the specific application. In addition, by varying the length and stiffness of the spring, entry into the hydraulic stop function can be accelerated or delayed. Utilizing the rebound cutoff valve collar to alter fluid flow relieves the rod guide from having to provide this function. This advantageously results in a hydraulic rebound stop that is applicable to strut-type dampers.

BRIEF DESCRIPTION OF THE DRAWINGS

FIG. 1 is a fragmentary cross-sectional view of a suspension strut.

FIG. 2 is a fragmentary cross-sectional view of the suspension strut of FIG. 1 detailing the rebound stop features shown in an operative position away from the rebound limit.

DETAILED DESCRIPTION OF THE PRESENTLY PREFERRED EMBODIMENT

Figure 3:
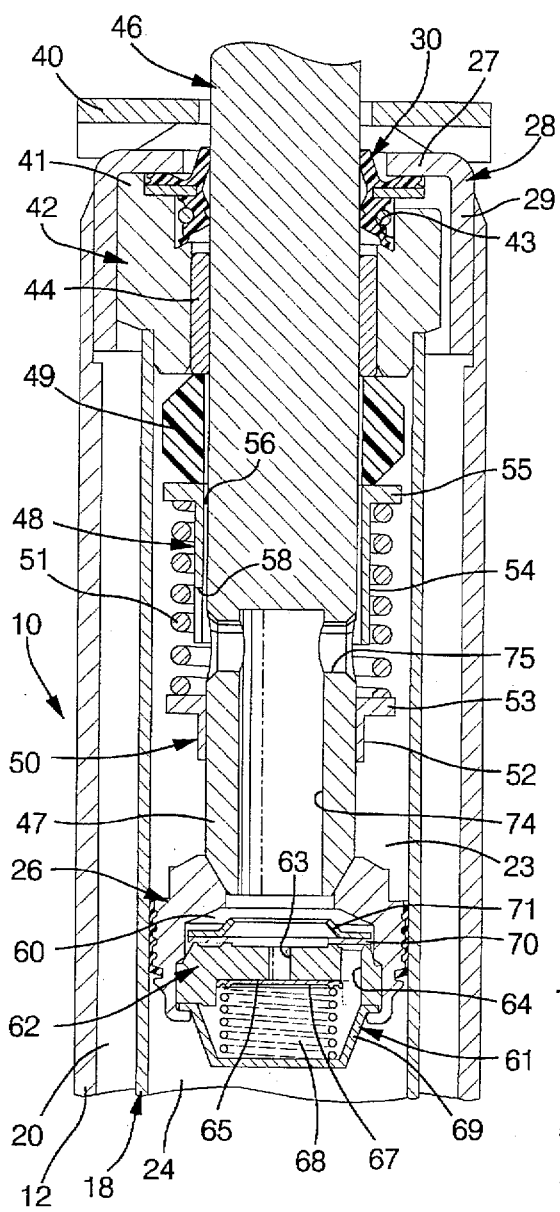
FIG. 3 is a fragmentary cross-sectional illustration of the suspension strut of FIG. 1 detailing the rebound stop features shown in an operative position after entry into the hydraulic stop function.

Referring to the drawings, illustrated in FIG. 1 is a suspension damper for a vehicle suspension embodied as strut 10. Strut 10 includes a cylindrical reservoir tube 12 having a mounting bracket 14 secured thereto for connection to a vehicle wheel assembly at a turnable steering knuckle and hub assembly, (not illustrated). The reservoir tube 12 is closed at its lower end by a base cup 16 which is secured thereto or formed as an integral part thereof.

Axially disposed within the reservoir tube is cylinder tube 18. The cylinder tube 18 has a smaller diameter than the reservoir tube 12 and cooperates therewith to provide a reservoir 20 which contains a quantity of oil that is used as a damping medium in the strut 10. The cylinder tube 18 has a base valve assembly 22 secured in the lower end thereof which controls the flow of oil between the reservoir 20 and a compression chamber 24 and transfers loads between the cylinder tube 18 and the reservoir tube 12. The compression chamber 24 is formed in the cylinder tube 18 beneath a valved piston assembly 26. The piston assembly 26 is slidably mounted in the cylinder tube 18.

The upper end 19 of cylinder tube 18 is connected to a cylindrical piston rod guide 42 having an inner bushing 44 slidably receiving piston rod 46. Piston rod 46 is fixed at its lower end 47 to piston assembly 26. The piston rod guide 42 is formed with a counterbore 43 in its upper end 41 which receives an annular elastomeric seal 30.

Since the strut 10 operates to provide damping force when installed in a vehicle's suspension and in addition, to support loads on the suspension, the rod guide 42, base valve assembly 22 and tubes 12, 18 are constructed to carry such loads as is known in the art.

Seal 30 provides a means of sealing fluids within the strut 10 and a means of preventing contaminants from entering the strut 10. Seal 30 surrounds the piston rod 46 and is resiliently biased thereagainst. Seal cover 28 holds seal 30 in counterbore 43 and has inner cylindrical wall 29 captured between piston rod guide 42 and reservoir tube 12. Seal cover 28 also includes annular wall 27. The reservoir tube 12 is secured to the seal cover 28 by a means such as welding. A bumper plate 40 is secured to the top of seal cover 28 by means such as welding and serves to contact an elastomeric jounce bumper (not illustrated).

The upper end 25 of piston rod 46 extends from strut 10 and provides a means of attachment to a vehicle body through a mounting (not illustrated), which when assembled in a front suspension assembly of a vehicle provides a means for rotating the strut 10 when steering the vehicle as is conventionally known in the art.

An annular spring seat 50 is secured to the piston rod 46 within the cylinder tube 18 and supports a spring 51. An annular rebound cutoff valve collar 48 is slidably carried on piston rod 46 and is spaced away from spring seat 50 by a spring 51. The valve collar 48 supports an annular elastomeric bumper 49 which is also slidably carried on piston rod 46 and is adapted to engage the lower surface of piston rod guide 42 when the strut 10 approaches a full rebound condition.

Other features of the strut 10 include a passage 45 between the base valve 22 and base cup 16 that provides clearance for the flow of oil between reservoir 20 and the compression chamber 24 during operation of the strut 10. In addition to carrying a supply of oil as a fluid within the strut 10 during the assembly process a pressurized gas is introduced through a conventional means (not illustrated) into the strut 10.

Referring additionally to FIG. 2, the interactive elements which form the damping and rebound stop features of the present invention are illustrated in greater detail. The piston 26 includes an internal cavity 60 which carries a damping valve assembly 61. The damping valve assembly 61 includes an annular valve plate 62 having a central flow opening 63 and a plurality of peripheral flow openings, representative of which is flow opening 64.

The valve plate 62 has a round surface 65 about central flow opening 63 with a valve disc 67 biased against valve plate 62 at round surface 65 by a spring 68. The spring 68 is supported on piston 26 by a spring retainer 69. An annular valve disc 70 is seated on the top of valve plate 62 and covers the peripheral flow opening 64. A retainer 71 assists in maintaining the annular valve disc 70 in a proper location.

The internal cavity 60 forms an opening into the longitudinal bore 74 which extends partly through the piston rod 46. A cross bore 75 extends through the piston rod 46 intersecting the longitudinal bore 74 and communicating with rebound chamber 23.

During a compression stroke of the piston 26 within the cylinder tube 18, the entirety of fluid flow from the compression chamber 24 to the rebound chamber 23 passes through the peripheral flow opening 64 unseating annular valve disc 70 from valve plate 62 and continuing through internal cavity 60, longitudinal bore 74 and cross bore 75 into rebound chamber 23. During a rebound stroke of the piston 26 within the cylinder tube 18, the entirety of fluid flow from rebound chamber 23 to compression chamber 24 passes through cross bore 75, longitudinal bore 74 and into internal cavity 60 through central flow opening 63 of valve plate 62 unseating valve disc 67 from the round surface 65 by compressing spring 68 so that flow may continue into compression chamber 24.

The spring seat 50 is fixed to the piston rod 46 between the piston 26 and the cross bore 75. Spring seat 50 includes a longitudinal leg 52 which is fixed to the piston rod 46 by means such as welding and a lateral leg 53 which is integrally formed with the longitudinal leg 52. Spring 51 is carried about piston rod 46 and engages lateral leg 53 of spring seat 50 supporting valve collar 48.

Valve collar 48 is of an annular configuration and includes longitudinal leg 54 and integral lateral leg 55. The lateral leg 55 engages the spring 51 and supports the bumper 49. During operation of the strut 10, the valve collar 48 is generally in the position shown, wherein the cross bore 75 is completely opened to the rebound chamber 23. An annular space 56 exists between valve collar 48 and piston rod 46 so that free sliding movement on the piston rod 46 is provided. The annular space 56 provides a flow opening between the piston rod 46 and the longitudinal leg 54.

Referring to FIG. 3, the strut 10 is illustrated in a rebound condition such that the bumper 49 has contacted the rod guide 42 and the hydraulic stop function has been entered. As the piston rod 46 exits the strut 10 during a rebound stroke, the bumper 49 contacts the rod guide 42 forcing the valve collar 48 to compress spring 51 such that the longitudinal leg 54 moves to begin closure of cross bore 75. As this occurs, fluid flow from the rebound chamber 23 to the compression chamber 24 is restricted by reducing the area of the flow path through cross bore 75. The increasing hydraulic restriction provides a means of slowing the rebound travel of piston rod 46.

Figure 4:
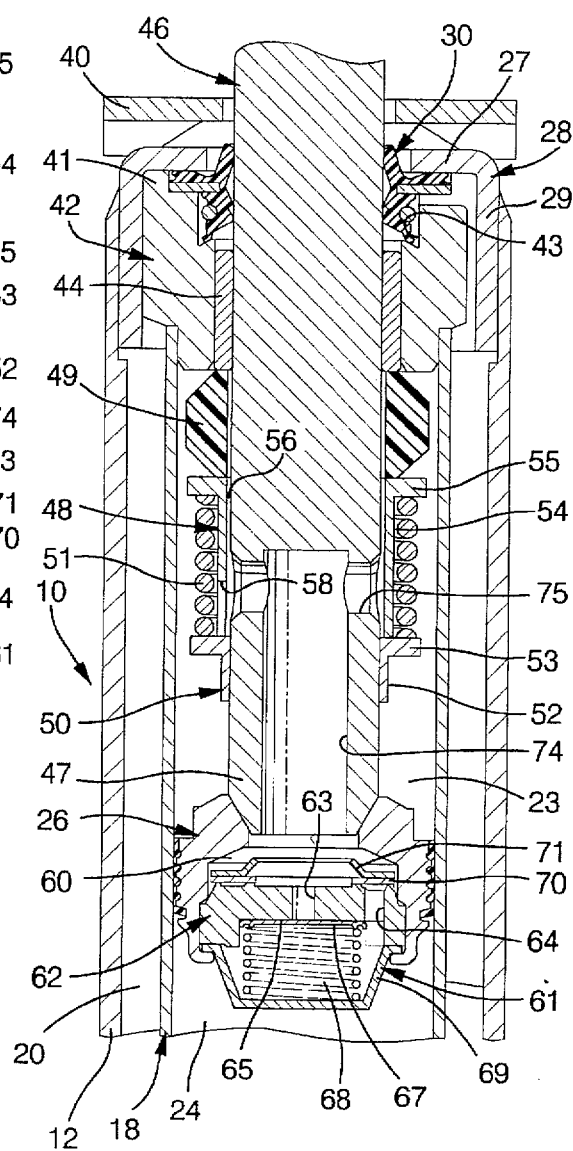
FIG. 4 is a fragmentary cross-sectional illustration of the suspension strut of FIG. 1 detailing the rebound stop features shown in an operative position at the mechanical stop rebound limit.

Referring to FIG. 4, strut 10 is illustrated at the rebound limit of travel wherein the longitudinal leg 54 of valve collar 48 has made positive mechanical contact with the spring seat 50. In this operative position the bumper 49 maintains a resilient form of contact between the rod guide 42 and the mechanical stop provided by spring seat 50 and valve collar 48.

The amount of hydraulic restriction provided by the valve collar 48 in slowing rebound travel of the strut 10 during closure of the cross bore 75 can be selectively adjusted by varying size of the annular space 56 that is provided between the valve collar 48 and the piston rod 46. In addition, if preferable for a given application, the longitudinal leg 54 of the valve collar 48 may be provided with a notch opening, such as notch opening 58, to reduce the rate of pressure rise during the hydraulic stop feature of the present invention.

What is claimed is:

1. A suspension strut comprising:

a cylinder tube;

a piston having a flow passage and being slidably carried in the cylinder tube separating the cylinder tube into a compression chamber and a rebound chamber;

a piston rod fixedly engaging the piston having a longitudinal bore communicating with the flow passage and having a cross bore intersecting the longitudinal bore;

an annular spring seat fixedly engaging the piston rod between the piston and the cross bore;

an annular valve collar slidably carried on the piston rod having a longitudinal leg spaced away from the piston rod forming a flow opening therebetween; and a spring extending between the annular spring seat and the annular valve collar wherein the spring normally holds the annular valve collar in a position wherein the cross bore is completely open to the rebound chamber, wherein the longitudinal leg of the annular valve collar includes a notch opening extending completely through the longitudinal leg to provide a reduced pressure rise rate when the annular valve collar initially slides on the piston rod to a position covering the cross bore.

2. A suspension strut according to claim 1 wherein the spring is compressible between the annular spring seat and the annular valve collar such that the annular valve collar is engageable with the annular spring seat providing a positive mechanical rebound travel limit.

3. A suspension strut according to claim 2 further comprising an annular resilient bumper slidably carried on the piston rod and supported on the annular valve collar.

4. A suspension strut according to claim 3 further comprising a rod guide fixedly engaging the cylinder tube wherein the piston rod slidably extends through the rod guide and wherein the annular resilient bumper is engageable with the rod guide so that the bumper and annular valve collar slide toward the piston on the rod compressing the spring and covering the cross bore only when the bumper engages the rod guide to cushion a stop at a rebound directed travel limit of the piston.

5. A suspension strut according to claim 4 further comprising a reservoir tube disposed about the cylinder tube and a base valve assembly engaging the cylinder tube, wherein the suspension strut is structurally capable of carrying lateral forces through the rod guide, the cylinder tube, the base valve assembly and the reservoir tube and includes an internal valving system providing damping.

6. A suspension strut comprising:

a cylinder tube;

a reservoir tube disposed about the cylinder tube;

a bracket secured to the reservoir tube;

a base valve assembly engaging the cylinder tube and carried within the reservoir tube;

a rod guide engaging the cylinder tube and the reservoir tube;

a piston having a flow passage and being slidably carried in the cylinder tube and separating the cylinder tube into compression and rebound chambers;

a piston rod fixedly engaging the piston and extending through the rod guide including a bushing supporting the rod;

wherein the suspension strut is structurally capable of carrying lateral forces imposed on the bracket and the rod through the reservoir tube, the rod guide, the cylinder tube and the base valve assembly and includes an internal valving system providing a damping force between the bracket and the rod;

wherein the piston has an internal cavity carrying a valve plate and forming part of the flow passage;

wherein the piston rod has a longitudinal bore communicating with the internal cavity and has a cross bore intersecting the longitudinal bore, in combination, the longitudinal bore, the cross bore and the internal cavity defining a sole flow passage for damping fluid flow through the piston between the compression chamber and the rebound chamber;

an annular spring seat fixedly engaging the piston rod between the piston and the cross bore;

an annular valve collar slidably carried on the piston rod having a longitudinal leg spaced away from the piston rod forming a flow opening therebetween with a notch opening extending completely through the longitudinal leg to provide a reduced pressure rise rate when the annular valve collar initially slides on the piston rod to a position covering the cross bore;

an annular resilient bumper supported on the annular valve collar and being engageable with the rod guide; and a spring extending between the annular spring seat and the annular valve collar being compressible between the annular spring seat and the annular valve collar such that the annular valve collar is engageable with the annular spring seat providing a positive mechanical rebound travel limit wherein the spring normally holds the annular valve collar in a position wherein the cross bore is completely open to the rebound chamber.

* * * * *